UNITED STATES PATENT OFFICE.

EXUM WHITLEY, OF MURFREESBOROUGH, NORTH CAROLINA, ASSIGNOR TO HIMSELF AND CHARLES H. FOSTER, OF SAME PLACE.

IMPROVEMENT IN THE MANUFACTURE OF FERTILIZERS.

Specification forming part of Letters Patent No. 105,283, dated July 12, 1870.

*To all whom it may concern:*

Be it known that I, EXUM WHITLEY, of Murfreesborough, in the county of Hertford and in the State of North Carolina, have invented a new and useful Improvement in Fertilizers, which I term "Kapnophyte*;" and I do hereby declare that the following is a full, clear, and exact description thereof.

This invention consists, first, in manufacturing or producing a fertilizer from the ashes of pine straw, leaves of trees, weeds, corn-stalks, stubble, and other vegetable débris, mixed with earth which has first been impregnated with the smoke of gaseous products rising from the burning vegetable matter; and, secondly, in the process of making the fertilizer, all as will be more fully set forth in the subjoined specification and claims.

The mode of preparing the fertilizer is as follows: A piece of ground is prepared by first scraping and leveling the surface, and then spading or loosening the earth with a hoe, spade, or other suitable instrument to a depth of from three to four inches. This bed may be circular or of any other form; but I prefer to make it rectangular, about seven or eight feet wide, and of any suitable length. Upon the center of this bed one or more fires are kindled, and the vegetable matters, such as pine straw, leaves of oak, maple, and all other forest trees, stubble, wheat, and all other kinds of straw, reeds, corn-stalks, grass, hay, potato-tops, vines of all kinds, pea-nut and cotton stalks, &c., previously wetted to prevent too rapid combustion, are heaped upon the fires to a depth of five or six feet, care being taken to form suitable passages for the access of air to the fires. This smoldering pile of vegetable débris is then covered by loose earth to a thickness of from six to nine inches, more or less, providing, of course, for air-passages, and left to burn until all the vegetable matter has been consumed or burned, which will take from ten to fifteen days. Nearly all the gaseous products of combustion will be absorbed and retained by the covering of earth, which becomes thus strongly impregnated by these gases. As the pile will gradually cave in as the vegetable matters are consumed, care must be taken to fill up any unnecessary cracks and crevices to prevent the escape of the gases as much as possible.

After the burning is completed, the residuum—that is, the ashes of the vegetable matter and the surrounding earth—thus impregnated by the gases, is well stirred and mixed, and the product constitutes the fertilizer, which is then ready for use.

A thorough test has proved the above to be a most valuable fertilizer, as it not only stimulates vegetation, like guano, but, unlike guano, permanently benefits the soil, and its cheapness and the facility of making the same will commend it to every farmer or land-owner.

Having thus described my invention, what I claim, and desire to secure by Letters Patent, is—

1. A fertilizer compounded of the ashes of vegetable matters and earth impregnated with the smoke and gases rising from the burning of such vegetable matters, substantially as set forth.

2. The process of burning vegetable matters under a covering of earth to impregnate the latter with the gaseous products of combustion rising from the former to produce a fertilizer, substantially as set forth.

The above specification signed by me.

EXUM  ×  WHITLEY.
his    mark.

Witnesses:
C. H. FOSTER,
J. A. CARTER.

---

*From the Greek καπνος, *smoke*, and φυτεία, *a producing*.